April 27, 1954

W. G. OCHEL ET AL
MULTICYLINDER 4-STROKE CYCLE
DIESEL ENGINE AND COMPRESSOR 2,676,752

Filed June 14, 1950

Inventors
WILLY G. OCHEL
OTTO K. BEYERMANN
FRIEDRICH H. GEHRMANN
By Toulmin & Toulmin
ATTORNEYS

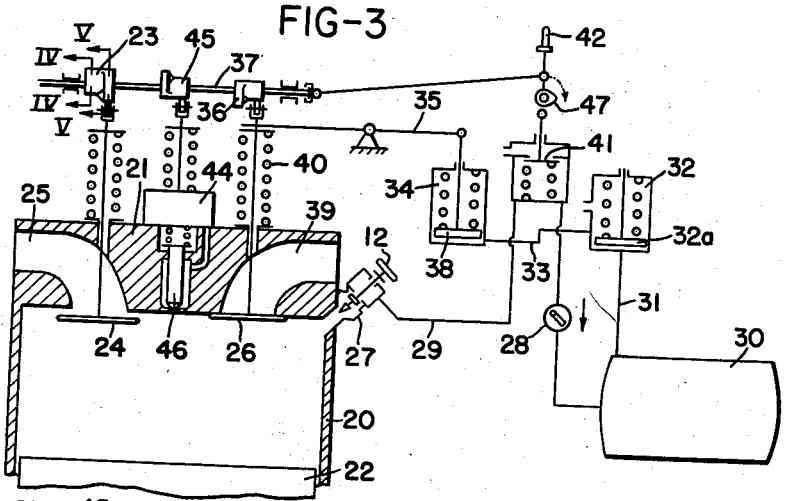

Patented Apr. 27, 1954

2,676,752

UNITED STATES PATENT OFFICE 2,676,752

MULTICYLINDER 4-STROKE CYCLE DIESEL ENGINE AND COMPRESSOR

Willy G. Ochel, Dortmund, Otto K. Beyermann, Bochum, and Friedrich H. Gehrmann, Dortmund-Korne, Nord-Rheinprovinz, Germany, assignors to Orenstein & Koppel Aktiengesellschaft, Berlin, Germany Application June 14, 1950, Serial No. 168,006

4 Claims. (Cl. 230—27)

The application of compressed air in many fields such as building industry, construction work, agriculture, e. g. cultivation of grapes, etc., requires compressor installations which must be movable from one place to another and, therefore, prior to the present invention, necessitated the employment of a separate diesel or gasoline engine as driving engine. However, the employment of separate compressor installations and driving engines not only requires increased space but, also necessitates a greater investment and higher maintenance cost.

It is, therefore, an object of the present invention to provide an arrangement which will overcome the above-mentioned drawbacks.

It is a further object of this invention to provide a multiple cylinder diesel engine, a portion of which may selectively be used for compressor service.

These and other objects and advantages of the invention will appear more clearly from the following specification in connection with the accompanying drawings in which:

Figure 3 represents a diagrammatic illustration of a control assembly adapted to cause the outlet valve of a diesel engine cylinder used for operation as a compressor to govern the compressor delivery.

Figure 4 is an enlarged cross-section through the inlet cam along line IV—IV.

Figure 5 is an enlarged cross-section through the inlet cam along line V—V.

Figure 6 represents a diagrammatic illustration of a four cylinder engine according to the invention.

Figures 1, 2:
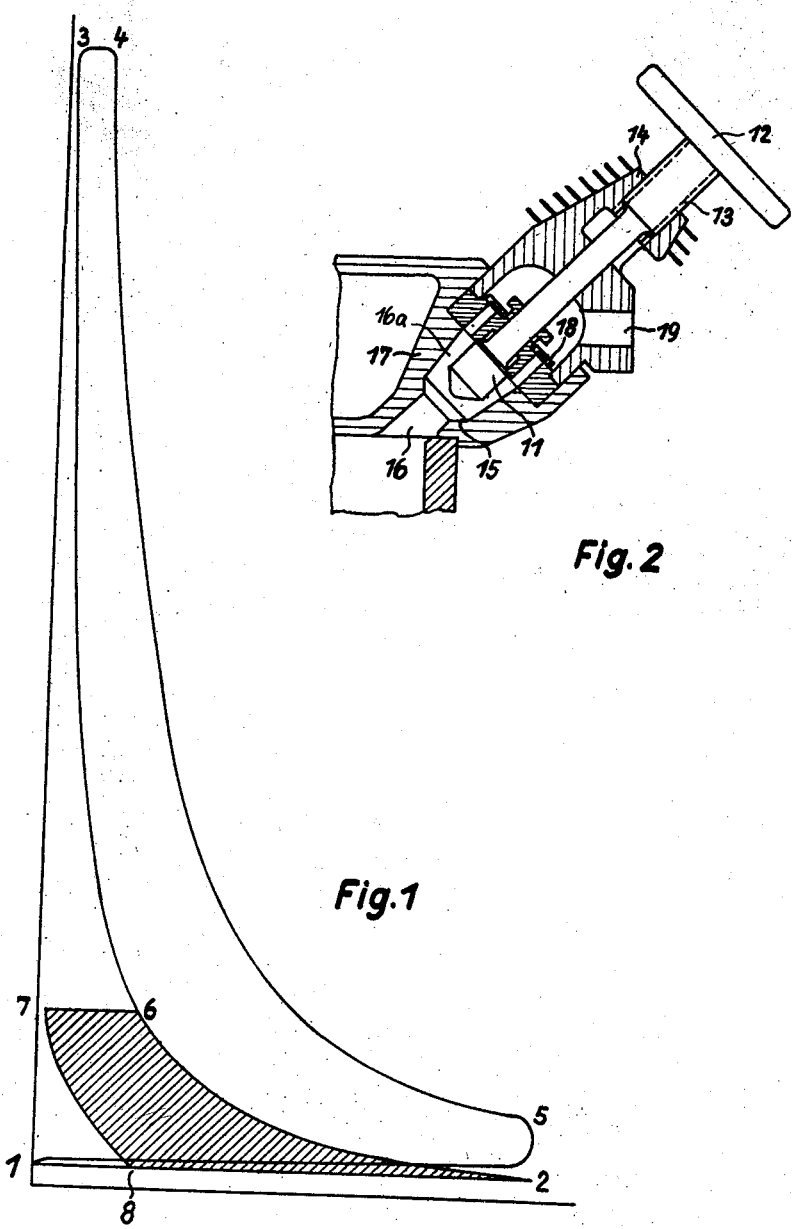
Figure 1 illustrates an indicator diagram of a compound-compressor diesel engine installation according to the present invention.
Figure 2 is a section through a discharge valve for use in connection with the present invention.

Referring now to the drawings in detail, the invention will best be understood with reference to Figure 1. This figure illustrates an indicator diagram 1—2—3—4—5—1— of a four-stroke diesel engine. At the point 1, the inlet valve opens and the cylinder draws in air until the piston has reached a point corresponding to point 2 of the diagram. When the direction of the piston is reversed, the drawn in air is compressed according to line 2—3. At this point, the injection takes place, followed by the combustion of the fuel along the line 3—4 and by the expansion of the combustion gases along the line 4—5. At the point 5, shortly before the dead center, the outlet valve opens and allows the burned gases to expand toward the outside. The piston drives the remainder of the exhaust gases out of the cylinder acocrding to the line 5—1. Thereupon, a new working cycle starts with the intake of fresh air.

According to the present invention each of a predetermined number of cylinders is equipped with a discharge valve which is connected with a compressed air container and kept closed during motor operation of said cylinders, and further equipped with a second inlet valve cam capable to be brought at will into operation with the inlet valve whilst the set of cams for motor operation of said cylinders is made inoperative and whilst said discharge valve is freed to open automatically at point 6 when the pressure has exceeded the pressure of the compressed air container permitting the compressed air to be discharged from the cylinder along the line 6—7 and to close at point 7, whereby the said second inlet valve cam operates the inlet valve in such a manner that the inlet valve opens at each down-stroke of the piston of the corresponding cylinder at point 8 when the pressure of the compressed air which remains in the clearance or head space of said cylinder has expanded according to the line 7—8 to about atmospheric pressure thus permitting fresh air to be taken in and closes at about the end of said down-stroke at point 2.

Here, a new working cycle starts with the compression of new fresh air according to the line 2—6. Advantageously, the inlet and discharge valves of the cylinder may accomplish the described connections, although other means may also be employed.

It has been found that with the pressure of compressed air used in most instances, for instance, in the building industry, construction work and the like, the indicator diagram of a two-stroke compressor cylinder covers an area less than half the area of an indicator diagram representing the work of a cylinder of a four-stroke diesel engine. Therefore, as a rule, it is possible to run half of the cylinder piston assemblies of a multi-cylinder diesel engine as compressor cylinder piston assemblies according to the present invention, and to drive these compressor cylinder piston assemblies with the other half of the cylinder piston assemblies working as a motor. In the engine shown in Figure 6 the two outer cylinders are changeable so as to run selectively as motor cylinders or as compressor cylinders.

The changeover of the cylinders from motor operation to compressor operation may be effected in any known or other convenient manner, for instance by shifting the cam shaft, in which instance the cams of the inlet, the outlet and the fuel valves pertaining to the cylinders which continue working as motor cylinders are preferably provided so wide that, when the camshaft is shifted, the cam rollers remain on the cams whilst the cams of the outlet and fuel valves pertaining to the other cylinders are brought out of operation with their cam rollers. The cam rollers of the inlet and outlet valves of the compressor cylinders must, however, during the switch from motor to compressor operation be transferred to cams by which the valves will be opened and closed according to the compressor indicator diagram referred to above. In other words, the said valves must open and close twice during one revolution of the cam.

It is obvious that during compressor operation the supply of fuel to the compressor cylinders must be interrupted. This may be effected, for instance, by taking the cam rollers which actuate the respective fuel pumps out of the range of the cams pertaining thereto.

An embodiment of a valve is illustrated by way of example in Figure 2. As will be clear from this figure, the valve comprises a valve spindle 11, provided at its upper end with a hand wheel 12 and having a threaded portion 13 engaging a correspondingly threaded portion in the valve casing 14. By rotating the hand wheel 12, the lower end of the valve spindle 11 may selectively be pressed against the valve seat 15 to thereby interrupt communication between the bore 16 in the cylinder head 17 and the chamber 16a. This is the position of the valve when driving the cylinders as motor cylinders.

When operating some cylinders as compressor cylinders, the spindle 11, by corresponding rotation of the hand wheel 12, is lifted off its seat 15, as shown in Figure 2. This enables the air compressed in the cylinder to pass from the bore 16 into the chamber 16a where it acts upon a valve disc 18. The air pressure then lifts the disc 18 so that the compressed air may pass into the bore 19 and from there to a compressed air conduit connected thereto, provided the pressure in the compressor cylinder has exceeded the pressure in the compressed air conduit.

According to a further modification of the present invention, a new control may be provided for the compressor cylinders. Heretofore, it was common to interrupt the delivery of compressors by maintaining the inlet valves open or by closing the inlet conduits. However, if, with an installation of the nature referred to, the inlet valves were held open, it would involve the risk that the pistons would knock against, or strike, the valves extending into the cylinder space. According to this modification the outlet valve which leads to the atmosphere is held normally closed during compressor operation with the inlet valve supplying air to the cylinder and the compressed air being discharged through the described discharge valve of Figure 2. In order to interrupt the delivery, the outlet valve is opened by a governor so that the delivered air may escape into the atmosphere and will not be pressed into the compressed air conduit. This type of regulating is superior to the method of interrupting the delivery of compressed air by maintaining the inlet valves open in that the outlet valves used according to the invention for the regulating operation normally stand still so that the harmful shocks by the cams and cam rollers are avoided. Such shocks may occur with an inlet valve, when such a valve for regulating the delivery of compressed air is lifted off the cam and has to be reseated upon the same. Also, due to the fact that the inlet valves are not opened farther than is required by the influence of the cams, there is no danger that the pistons will knock against the inlet valves. The actuation of the outlet valves used for the regulating operation may be effected in the following manner:

As soon as an excess pressure develops in the compressed air container, an automatic air pressure regulator known per se becomes effective. When this regulator becomes effective, it will release compressed air from the said container, which air acts on a control member that opens the outlet valve. When the air pressure drops, the air pressure regulator automatically relieves the conduit leading to the control member, whereupon the control member again closes the outlet valve.

According to a further development of the invention, there is provided in the conduit leading from the compressor to the compressed air container, a valve which opens against the pressure in the conduit and serves to indicate when the shifting of the cylinders from compressor operation back to motor operation is incomplete or faulty, the particular indication given being that the discharge valve has not been closed. When shifting from compressor operation to motor operation, in other words, when making the fuel delivery effective, this valve establishes a connection of the conduit leading from the discharge valve to the atmosphere so that the compression gases which might pass into the compressed air conduit will be able to escape visibly and audibly. If this valve is arranged so that the escape of the compression gases can visibly be noticed by the operator operating the motor, a safety measure or safety signal is thus given, drawing the attention of the operator to the fact that he still has to close the discharge valve. Furthermore, during the operation of the motor as diesel engine, any combustible gases which, due to leakages of the discharge valve, might escape into the compressed air conduit will automatically escape through this safety valve so that they cannot cause any harmful effects in the compressed air conduit and in the container for the compressed air.

As will be obvious, the required quantity of compressed air will in the individual instances depend upon the particular work involved, for instance, on the number of the drill hammers, rivet hammers, spray guns for painting, etc. Therefore, in order to adapt the compressor discharge to the required quantity of compressed air, it is preferable to provide the motor with a governor which may be adjusted according to definite desired numbers of revolutions. For instance, if, at best only half the quantity of compressed air is needed, which the compressor may furnish at its highest speed, the governor may be adjusted for half of the maximum number of revolutions.

The above-mentioned further developments are diagrammatically illustrated in Figure 3. This figure illustrates the manner in which the outlet valve of a cylinder shifted for compressor operation and pertaining to a four-stroke diesel engine may be used for regulating the compressor delivery. Figure 3 also illustrates the arrangement of a safety valve provided in the conduit leading from the compressor to the container for compressed air. The cylinder 20, provided with the cylinder head 21, has reciprocably mounted therein the piston 22. The valve 24, controlled by the cam shaft 23, serves as inlet valve for the air passing through the passage 25 into the cylinder 20. The valve 26 represents the outlet valve and the valve 46 the fuel valve which is fed by the fuel pump 44 actuated by the cam 45. The cylinder 20 is adapted to communicate with a conduit 29 through a discharge valve 27 adapted to open and, also, adapted to be maintained closed during motor operation.

The air conduit 29, which leads to the container for compressed air 30, has mounted therein a check valve 28. The container 30 communicates through a conduit 31 with a regulator 32. This regulator is adapted through conduit 33 to act upon a control device 34, which latter is adapted to actuate the outlet valve 26 by means of a lever 35. When the cylinder 20 is to be used for compressor operation the lever 42 is brought into the upright position, as shown in Figure 3, the cam shaft 37 thereby is shifted, and the discharge valve 27 is opened, while the outlet valve 26 is prevented from being actuated by the cam 36 of the cam shaft 37 so that normally it will remain closed and while the fuel pump 44 is prevented from being actuated by the cam 45. The inlet valve 24 is now actuated by such part of the cam 23 which has the cross-section shown in Figure 5 instead of that one shown in Figure 4.

When being actuated by the part of the cam 23 shown in Figure 4, the inlet valve opens on every second revolution of the cam shaft 37 at about the point UD when the piston is at its upper dead center point and closes at about the point LD when the piston is at its lower dead center point. This operation corresponds to the indicator diagram 1—2—3—4—5—1 of a four-stroke diesel engine as shown in Figure 1.

When being actuated by the part of the cam 23 shown in Figure 5, the inlet valve opens on each revolution of the cam shaft 37 at the point 48 which corresponds to the point 8 of the indicator diagram shown in Figure 1, and closes at about the point LD when the piston is at its lower dead center point. This operation corresponds to the indicator diagram 2—6—7—8—2 of a two-stroke compressor as shown in Figure 1. The air compressed in the cylinder 20 passes through the discharge valve 27 and the air conduit 29 into the compressed air container 30 to which will be connected the respective tools to be operated by compressed air. As soon as an excess pressure is created in the container 30, this pressure actuates the regulator 32 so as to lift the control member 32a to thereby cause compressed air to enter the conduit 33 leading to the control device 34. As a result thereof, the piston 38 of this control device is lifted so that it actuates the adjacent end of the lever 35, thereby causing the other preferably fork-shaped end of the lever 35 to open the outlet valve 26. As soon as this outlet valve is opened, no further compressed air will enter through the discharge valve 27 into the compressed air container 30, but will rather be discharged through the outlet passage 39 provided in the cylinder head 21. As soon as the excess pressure in the compressed air container 30 has been relieved, the regulator 32 closes the conduit 3 with regard to the conduit 31 and relieves the conduit 33 so that the piston 38 of the control device 34 may return to its previous position, thereby allowing the spring 40 of the outlet valve 26 to close the latter. The compressed air produced in the cylinder 20 will then again be passed into the container 30 through the discharge valve 27. If, again an excess pressure should develop in the container 30, the relief operation just described will be repeated.

The conduit 29 leading from the cylinder 20 to the compressed air container 30 has mounted therein a valve 41 adapted to be actuated by a shiftable lever 42. The lever 42 is, furthermore, adapted to effect the adjustment of the cams and to interrupt or re-establish the fuel supply when shifting from motor to compressor operation and when shifting from compressor to motor operation respectively. In the vertical position shown in the drawing, the lever 42 is adjusted for compressor operation. When shifting from compressor to diesel operation, the lever 42 is moved to the right into its horizontal position pressing down by means of cam 47, the valve 41 and opening it against the pressure in the conduit 29 so that the conduit 20 now communicates with the atmosphere and the compression gases may escape visibly anud audibly from the conduit 29 until the discharge valve 27 is closed by actuation of the hand wheel 12. The check valve 28 serves to interrupt the communication between the container 30 and the valve 41.

If, for some reason, there should be a leakage in the discharge valve 27 during diesel operation, so that combustible gases may accidentally pass from the cylinder 20 into the compressed air conduit 29, these gases will be passed into the atmosphere through the opened valve 41 so that they will not be able to cause any harmful effect.

It is, of course, understood that the present invention is by no means limited to the particular constructions shown in the drawings but, also, comprises any modifications within the scope of the appended claims.

What we claim is:

1. In a multiple cylinder 4-stroke diesel engine comprising inlet and outlet valves and fuel conveying means associated with each cylinder-piston assembly of said engine, a first set of cams to operate said inlet and outlet valves and fuel conveying means during normal operation of said engine, a second set of cams for operating the inlet valves of a predetermined number of said cylinder-piston assemblies so as to cause the said inlet valves to open at each down stroke of the piston of the pertaining cylinder-piston assembly when the pressure therein has reached about atmosphere pressure and to close said inlet valves about the end of the said down stroke of the piston and to render cams associated with said outlet valves and said fuel conveying means inoperative, a compressed air container, check valve means having outlet means connected with said compressed air container and inlet means connected with said predetermined number of said cylinders, means operable to maintain said check valve means on their seats during engine operation of said predetermined number of cylinders, and control means associated with said predetermined number of said cylinder-piston assemblies operable to bring the first set of cams pertaining to the said predetermined number of cylinder-piston assemblies out of operation and to bring the said second set of cams into operation.

2. A diesel engine according to claim 1 comprising further means operable in response to a predetermined delivered air pressure during compressor operation of said predetermined cylinder piston assemblies to open said outlet valves to the atmosphere.

3. A diesel engine according to claim 2, wherein the said further means comprises an air pressure cylinder fed with compressed air from said container and discharged by a control valve which connects the said air pressure cylinder alternatively with the said container, when the said predetermined air pressure is reached, and with the atmosphere when the air pressure is lower than the said predetermined air pressure.

4. A diesel engine according to claim 1 comprising a check valve mounted in the connection between said predetermined cylinder piston assemblies and the compressed air container, another and normally closed valve means interposed between said check valve and said predetermined cylinder piston assemblies and adjustable into position to connect said assemblies with the atmosphere, and adjusted into said position whilst said first set of cams of said cylinder piston assemblies is made inoperative.

References Cited in the file of this patent

UNITED STATES PATENTS

| Number | Name | Date |
| --- | --- | --- |
| 1,043,583 | Forry | Nov. 5, 1912 |
| 1,331,787 | Schlatter | Feb. 24, 1920 |
| 1,804,873 | Hoffman | May 12, 1931 |
| 2,003,456 | Nardone | June 4, 1935 |
| 2,400,581 | Walker | May 21, 1946 |